United States Patent
McPherson et al.

(10) Patent No.: US 6,359,855 B1
(45) Date of Patent: Mar. 19, 2002

(54) DATA MEDIA STORAGE LIBRARY WITH INTERCHANGEABLE MEDIA STORE AND DRIVES

(75) Inventors: Robert J. McPherson, Eden Prairie; Glen D. Kappel, Eagan, both of MN (US); Nigel Street, Cambridge (GB)

(73) Assignee: Plasmon IDE, Inc., Eden Prairie, MN (US)

( * ) Notice: Subject to any disclaimer, the term of this patent is extended or adjusted under 35 U.S.C. 154(b) by 684 days.

(21) Appl. No.: 08/744,207

(22) Filed: Nov. 5, 1996

(51) Int. Cl.[7] ............................................. G11B 17/22
(52) U.S. Cl. ...................................................... 369/191
(58) Field of Search ...................... 369/34, 36, 30.39, 369/30.52, 30.53, 30.54, 36.01; 360/92

(56) References Cited

U.S. PATENT DOCUMENTS

| | | | |
|---|---|---|---|
| 4,504,936 A | * 3/1985 | Faber et al. | 369/34 |
| 4,754,397 A | * 6/1988 | Varaiya et al. | 364/200 |
| 4,839,758 A | 6/1989 | Honjoh | 360/99.06 |
| 4,912,580 A | * 3/1990 | Hanson | 360/98.01 |
| 5,040,159 A | 8/1991 | Oliver et al. | 369/34 |
| 5,150,341 A | 9/1992 | Shibayama | 369/36 |
| 5,206,845 A | * 4/1993 | Baxter et al. | 369/34 |
| 5,377,121 A | 12/1994 | Dimitri et al. | 364/478 |
| 5,502,697 A | 3/1996 | Taki | 369/34 |
| 5,546,366 A | * 8/1996 | Dang | 369/36 |

FOREIGN PATENT DOCUMENTS

JP 5-282764 * 10/1993

* cited by examiner

*Primary Examiner*—William Klimowicz
(74) *Attorney, Agent, or Firm*—Gerald E. Helget; Nelson R. Capes; Rider, Bennett, Egan & Arundel

(57) ABSTRACT

A data storage library for storing and accessing data storage media, consisting of a housing, a storage array within the housing, the storage array having a wall, a media storage element arranged adjacent the storage array wall for holding storage media, a data transfer element arranged adjacent the storage array wall for reading and writing information on the storage media, an import/export element to transfer the storage media into and out of the data storage library, and a media transport element which moves along the storage array wall, the media transport element following any deviations in the wall to precisely position itself adjacent the media storage element and data transfer element.

11 Claims, 4 Drawing Sheets

DATA MEDIA STORAGE LIBRARY WITH INTERCHANGEABLE MEDIA STORE AND DRIVES

BACKGROUND OF THE INVENTION

Storage media library systems (jukeboxes) are devices which contain multiple storage media drives and many pieces of storage media to accommodate installations requiring access to large numbers of storage media, such as optical discs, compact discs and tape cartridges. The storage media may be housed in magazines which contain a fixed number of storage media. Existing storage media library systems are configured to contain a fixed number of magazines and a fixed number of drives.

Typically, a customer will make a purchase decision based on drive or media capacity. If a jukebox will only handle a maximum number of drives or media, and still not meet the customer requirements, then a larger jukebox is required. Some customers will require a larger ratio of drives to media and some will require the opposite. This may demand the selection of a jukebox which is much larger than needed in order to fulfill the specific needs of the customer.

There is a need for a data media storage library with a fixed number of homogeneous 'slots' which can be populated with either drives or storage media. This allows for customization of a library system which meets the specific requirements of the end user. The customer can opt to swap drives for media to tailor the jukebox to their needs, and minimize the necessity to purchase a larger system with capabilities they may not fully realize. This allows for easy future expansion if needed.

SUMMARY OF THE INVENTION

A data media storage library for storing and accessing storage media such as optical discs, CDs, tape cartridges, and PCMCIA cards, consisting of a housing containing a storage array with a number of storage locations therein; a number of media storage elements for holding the storage media; a number of data transfer elements for reading and writing information on the storage media; and a media transport element for moving the storage media between the media storage elements and the data transfer elements. Each storage location may engage one of the media storage elements and data transfer elements, thereby allowing the interchangeability of media storage elements with data transfer elements within the storage array.

A principal object and advantage of the present invention is that it provides a data media storage library with a fixed number of homogeneous 'slots' which can be populated with either drives or storage media. This allows for customization of a library system which meets the specific requirements of the end user. The customer can opt to swap drives for media to tailor the jukebox to their needs, and minimize the necessity to purchase a larger system with capabilities they may not fully realize. This allows for easy future expansion if needed.

A second principal object and advantage of the present invention is that it allows for a drive to be removed from the data storage library while power is on, that is, it allows the drive to be "hot swapped". which is now a serviceability requirement in the industry.

Another object and advantage of the present invention is that it provides a drive assembly which contains a quick release fastening mechanism to simplify the installation and removal of drives. Installation of drives is achieved by simply pushing the assembly into a slot until the spring-loaded latch engages. Actuation of the latch mechanism is all that is required to disengage a drive from the jukebox.

A feature of the invention is that the media storage element and the data transfer element both have the same width and height, so that a given slot can hold either one.

BRIEF DESCRIPTION OF THE DRAWINGS

Another feature of the invention is a media storage element adapter and a data transfer element adapter which accommodate for differing widths of the media storage elements and data transfer elements, so that the media storage elements and data transfer elements are aligned at the same relative position in the slots.

DETAILED DESCRIPTION OF THE PREFERRED EMBODIMENTS

Figure 1:
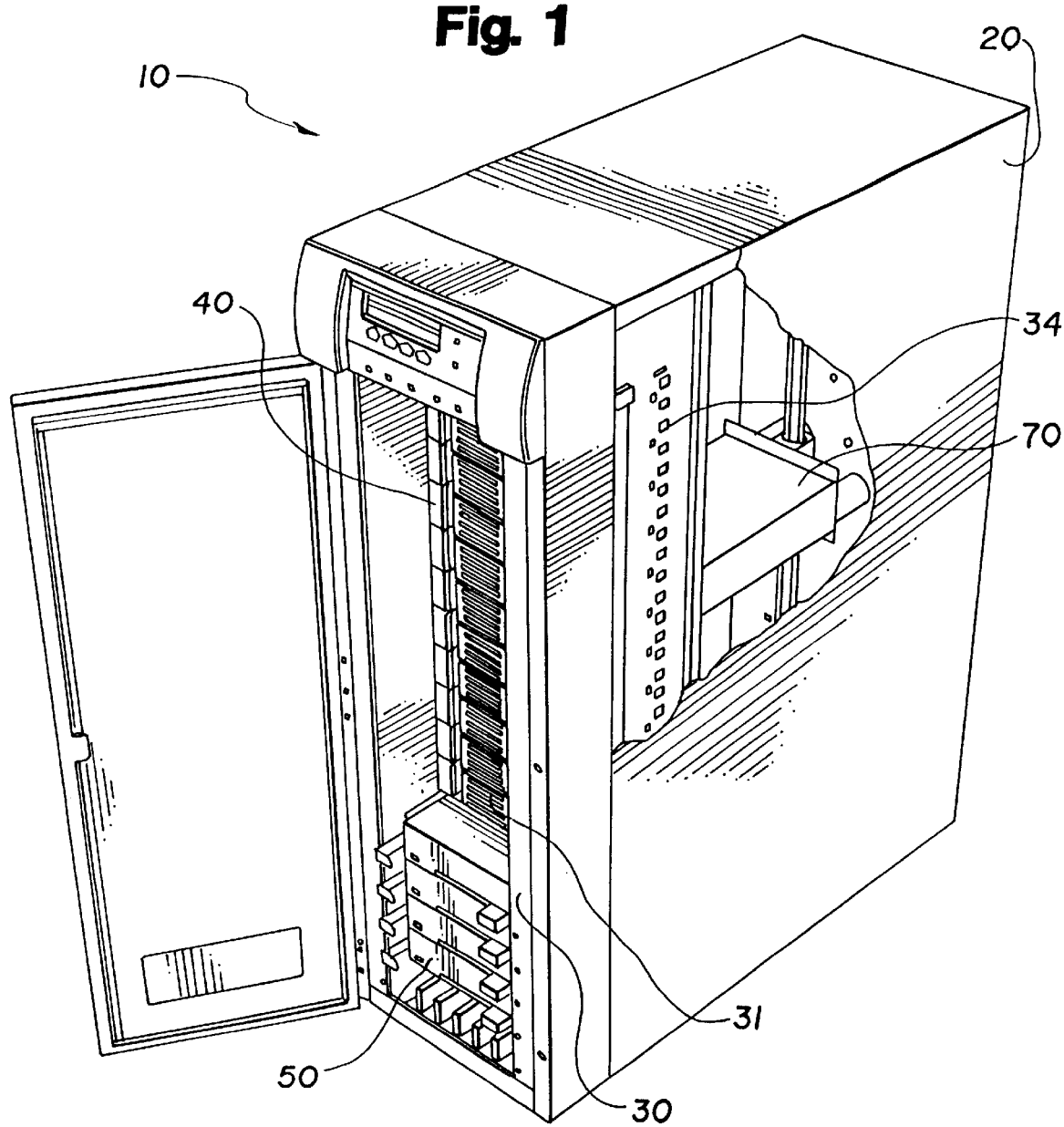
FIG. 1 is a front perspective view of the present invention.

The data storage library of the present invention is generally shown in the Figures as reference numeral 10.

The data storage library 10 consists of a housing 20 which provides a protective environment for the other components of the data storage library 10.

Within the housing 20 is at least one storage array 30 which holds a number of other components in storage locations 31. Preferably, more than one storage array 30 is contained within the housing 20. In the preferred embodiment, the storage array 30 is a vertical column, but any other orientation or shape such as horizontal or polygonal is also possible.

Arranged within the storage array 30 is at least one and preferably several media storage elements 40. The media storage elements 40 hold the storage media when the storage media are not being read or written to. The storage media can be any media which can be used to record information, such as data and graphics. The recording means may be magnetic, optical, or any other equivalent recording means known in the storage media art. Preferably, the storage media are compact discs (CDs). Preferably, the media storage elements 40 are trays which hold the CDs.

Also arranged within the storage array 30 is at least one and preferably several data transfer elements 50, which are used to read and write information on the storage media. Preferably, the data transfer elements 50 are compact disc drives (CD drives) but the data transfer elements 50 may be any equivalent device such as an optical disc drive, a cassette drive, floppy disc drive or hard drive. The latest CD drives allow the CD to be written to as well as read from, in which case the media is called a PD. Such writable PDs are readily available, an example being the Panasonic LM-RP6500A PD.

A media transport element 70 is movable within the housing 20 to move the storage media among media storage elements 40 and data transfer elements 50 within a storage array 30, and also to move between storage arrays 30 when there is more than one storage array.

The data media storage library 10 may preferably include a store guide 32 within the storage array, the store guide 32 having slots 34. In the preferred embodiment, the store guide 32 is a pair of plastic molded rails attached to the storage array 30. The slots 34 act as storage locations 31.

Preferably, the data media storage library 10 also comprises a number of media storage element adapters 42 which engage the store guide slots 34 and the media storage elements 40 to hold the media storage elements 40 in the slots 34 and allow the media storage elements 40 to be removed from the slots 34.

In the preferred embodiment, the media storage elements 40 are magazines 44 having a plurality of trays therein for holding compact discs (CDs).

Preferably, the data media storage library 10 also comprises a number of data transfer element adapters 52 which engage the store guide slots 34 and the data transfer elements 50 to hold the data transfer elements 50 in the slots 34 and allow the data transfer elements 50 to be removed from the slots 34.

In the preferred embodiment, the data transfer elements 50 are CD drives 54 and the data transfer element adapter further comprises a mounting plate 56 and latching mechanism 57, the latching mechanism 57 engaging the CD drive 54 and holding the CD drive 54 within the data transfer element adapter 52. Preferably, the latch mechanism 57 is spring-loaded.

To meet serviceability requirements, it is preferred that the data transfer elements 50 can be removed from the slots 34 while power is supplied to the library 10.

Preferably, the width of the media storage element 40 is substantially the same as the width of the data transfer element 50, and the height of the media storage element 40 is substantially the same as the height of the data transfer element 50, thereby allowing the interchangeability of media storage elements 40 and data transfer elements 50 in any given slot.

Figure 2:
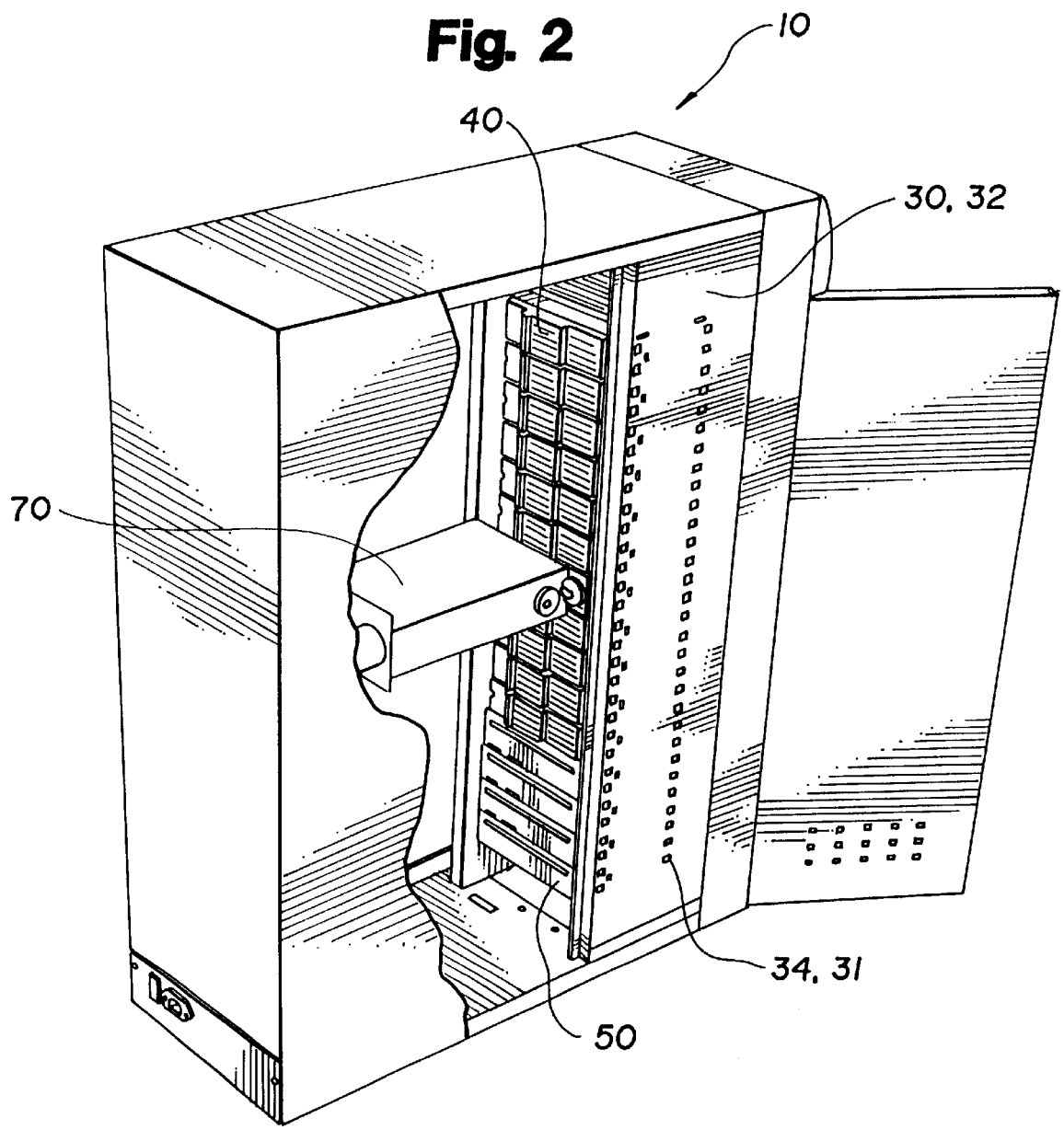
FIG. 2 is a rear perspective view of the present invention.
Figure 3:
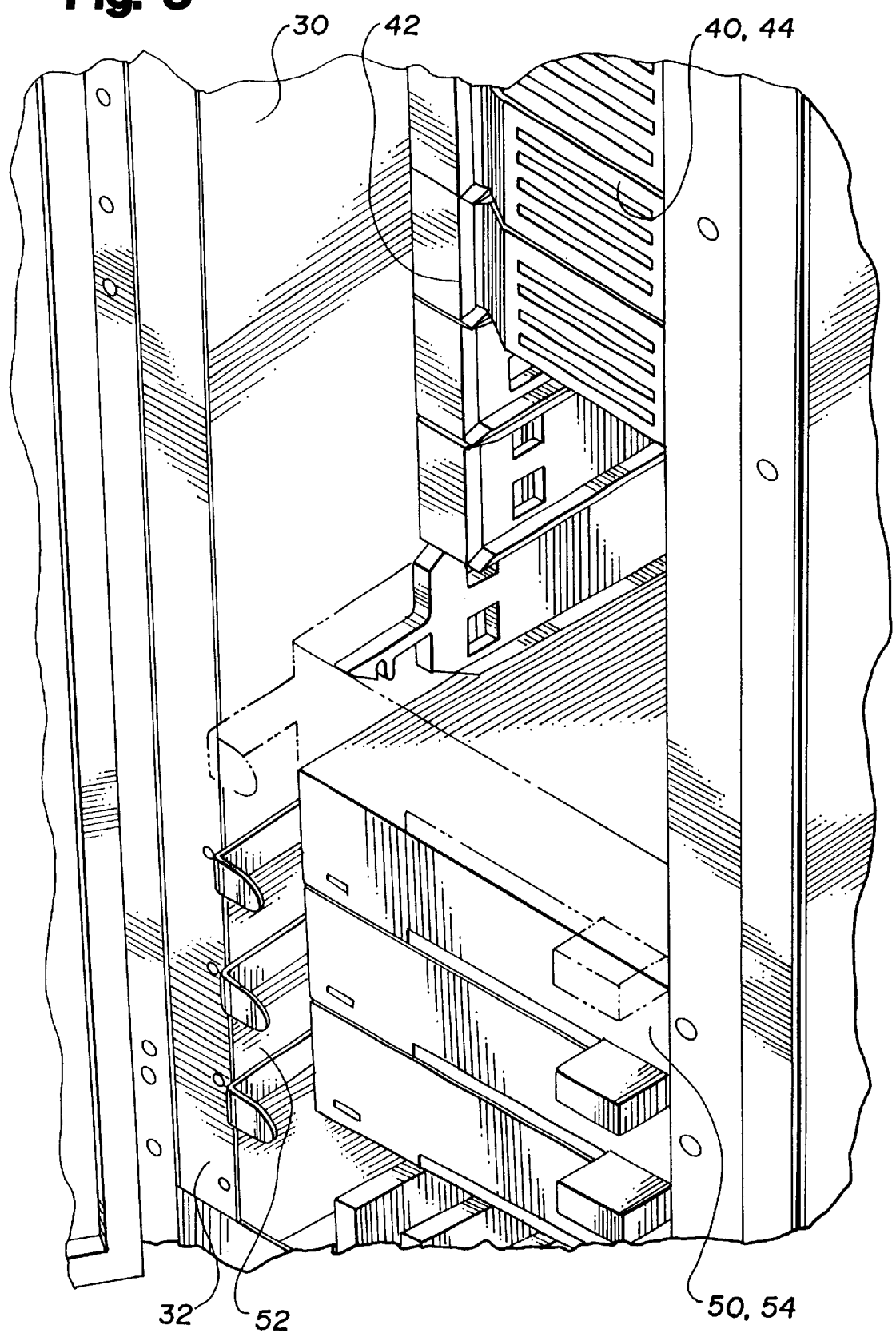
FIG. 3 is a detailed perspective view of the present invention.
Figure 4:
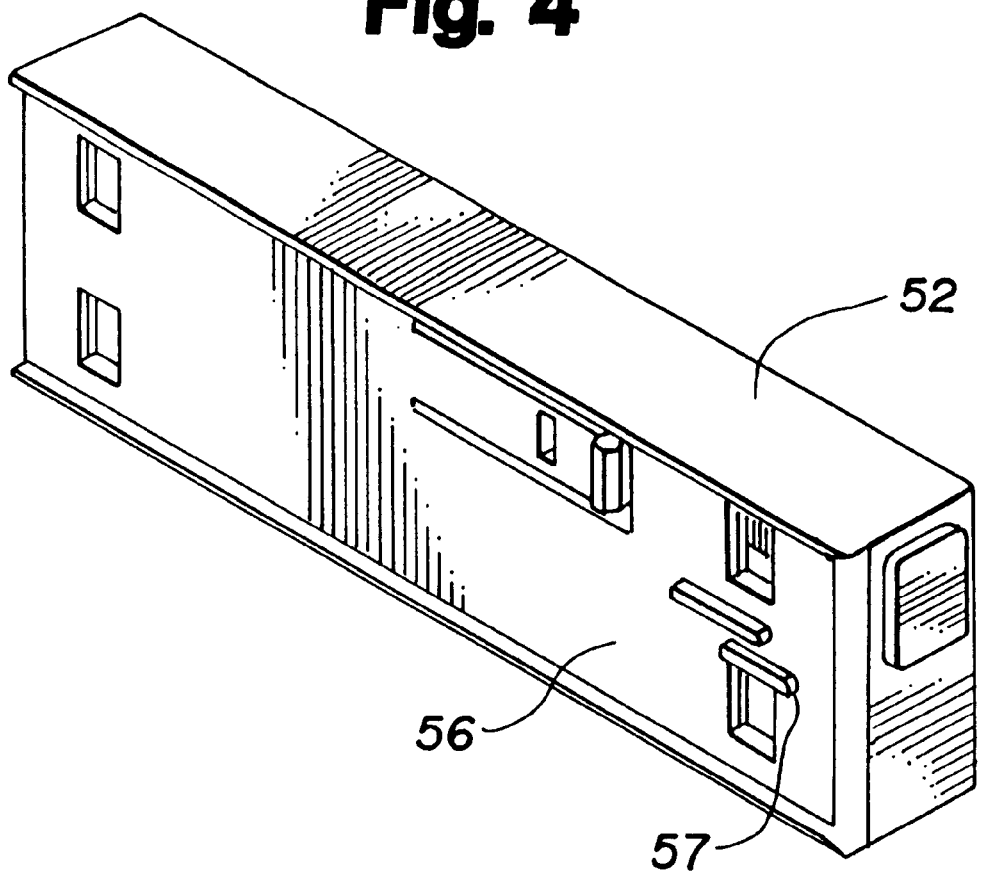
FIG. 4 is a detailed view of the data transfer element adapter.

However, as best seen in FIG. 3, the width of the media storage element and data transfer element may be different. The media storage element adapter and data transfer element adapter accommodate these differences so that a given slot in the store guide can be used for either a media storage element or a data transfer element with the media storage element and data transfer element aligned at the same relative position in each slot within the storage array as shown in FIG. 2.

In operation, the user populates the slots 34 with the appropriate number of media storage elements 40 and data transfer elements 50 as needed by his application. When power is applied, the data media storage library 10 will determine, by appropriate means, whether a given slot is empty, contains a media storage element 40, or contains a data transfer element 50. Appropriate software executing in the data media storage library 10 determines which data transfer element 50 is to be used to read or write to any given medium in a media storage element 40. The media transport element 70 will then move the medium between the appropriate media storage element 40 and data transfer element 50.

If the user wishes to remove a media storage element 40 or data transfer element 50, an appropriate software command is issued to the data media transfer library 10, the housing 20 is opened, and the media storage element 40 or data transfer element 50 is removed from a slot 34. In the case of the data transfer element 50, removal may be advantageously executed by releasing the latching mechanism 57.

The present invention may be embodied in other specific forms without departing from the spirit or essential attributes thereof, and it is therefore desired that the present embodiment be considered in all respects as illustrative and not restrictive, reference being made to the appended claims rather than to the foregoing description to indicate the scope of the invention.

What is claimed:

1. A data media storage library for storing and accessing storage media, the library comprising:

(a) a housing;

(b) a storage array within the housing, the storage array having a number of storage locations;

(c) a plurality of media storage elements adapted to hold the storage media;

(d) a plurality of data transfer elements adapted to read and write information on the storage media;

(e) a media transport element within the housing adapted to move the storage media between the media storage element and data transfer element;

(f) a store guide within the storage array and wherein the storage locations are slots arranged in the store guide;

(g) a media storage element adapter engaging the store guide slot and the media storage element for holding the media storage element in the slot and allowing the media storage element to be removed from the slot; and (h) a data transfer element adapter engaging the store guide slot and the data transfer element for holding the data transfer element in the slot and allowing the data transfer element to be removed from the slot, the data transfer element adapter further comprising a mounting plate and a spring-loaded latching mechanism for engaging the data transfer element, wherein each storage location may engage one of the media storage elements and the data transfer elements, thereby allowing the interchangeability of media storage elements with data transfer elements within the storage array, wherein the data transfer element can be removed from the slot while power is supplied to the data storage library.

2. The data media storage library of claim 1, wherein the media storage element is a magazine having a plurality of trays therein, each tray holding a CD.

3. The data media storage library of claim 1, wherein the data transfer element is a CD drive.

4. The data media storage library of claim 1, wherein the width of the media storage element is substantially the same as the width of the data transfer element, and the height of the media storage element is substantially the same as the height of the data transfer element.

5. The data media storage library of claim 1, wherein the width of the media storage element differs from the width of the data transfer element, the media storage element adapter and data transfer element adapter accommodating this difference and aligning the media storage element and data transfer element at the same relative position in each slot of the storage array.

6. A data media storage library for storing and accessing storage media, the library comprising:

(a) a housing;

(b) a storage array within the housing, the storage array having a number of storage locations, further comprising a store guide within the storage array and wherein the storage locations are slots arranged in the store guide;

(c) a plurality of media storage elements adapted to hold the storage media, further comprising a media storage element adapter engaging the store guide slot and the media storage element for holding the media storage element in the slot and allowing the media storage element to be removed from the slot;

(d) a plurality of data transfer elements adapted to read and write information on the storage media, further comprising a data transfer element adapter engaging the store guide slot and the data transfer element for holding the data transfer element in the slot and allowing the data transfer element to be removed from the slot; and (e) a media transport element within the housing adapted to move the storage media between the media storage element and data transfer element wherein each storage location may engage one of the media storage elements and the data transfer elements, thereby allowing the interchangeability of media storage elements with data transfer elements within the storage array, wherein the data transfer element can be removed from the slot while power is supplied to the data storage library.

7. The data media storage library of claim 6, wherein the media storage element is a magazine having a plurality of trays therein, each tray holding a CD.

8. The data media storage library of claim 6, wherein the data transfer element is a CD drive, and the data transfer element adapter further comprises a mounting plate and a latching mechanism, the latching mechanism engaging the CD drive and holding the CD drive within the data transfer element adapter.

9. The data media storage library of claim 8, wherein the latching mechanism is spring-loaded.

10. The data media storage library of claim 6, wherein the width of the media storage element is substantially the same as the width of the data transfer element, and the height of the media storage element is substantially the same as the height of the data transfer element.

11. A data media storage library for storing and accessing storage media, the library comprising:

(a) a housing;

(b) a storage array within the housing, the storage array having a number of storage locations, further comprising a store guide within the storage array and wherein the storage locations are slots arranged in the store guide;

(c) a plurality of CD magazines adapted to hold CD storage media, further comprising a CD magazine adapter engaging the store guide slot and the CD magazine for holding the CD magazine in the slot and allowing the CD magazine to be removed from the slot;

(d) a plurality of CD drives adapted to read and write information on the storage media, further comprising a CD drive adapter engaging the store guide slot and the CD drive for holding the CD drive in the slot and allowing the CD drive to be removed from the slot;

(e) a media transport element within the housing adapted to move the storage media between the CD magazine and CD drive; and (f) a mounting plate and a latching mechanism, the latching mechanism engaging the CD drive and holding the CD drive within the CD drive adapter, wherein the latching mechanism is spring-loaded, wherein the CD drive can be removed from the slot while power is supplied to the data storage library, wherein each storage location may engage one of the CD magazines and the CD drives, the width of the CD magazine equals the width of the CD drive, and the height of the CD magazine equals the height of the CD drive, thereby allowing the interchangeability of CD magazines with CD drives within the storage array.

\* \* \* \* \*